(12) United States Patent
Scott

(10) Patent No.: US 9,914,396 B1
(45) Date of Patent: Mar. 13, 2018

(54) EASY-CLIMB

(71) Applicant: Raymond E Scott, Pennellville, NY (US)

(72) Inventor: Raymond E Scott, Pennellville, NY (US)

(73) Assignee: Raymond E Scott, Pennellville, NY (US)

( * ) Notice: Subject to any disclaimer, the term of this patent is extended or adjusted under 35 U.S.C. 154(b) by 0 days.

(21) Appl. No.: 15/530,287

(22) Filed: Dec. 19, 2016

(51) Int. Cl.
| | | |
|---|---|---|
| E06C 5/04 | (2006.01) | |
| B60R 3/00 | (2006.01) | |
| E06C 5/24 | (2006.01) | |
| B60R 3/02 | (2006.01) | |

(52) U.S. Cl.
CPC ............ *B60R 3/005* (2013.01); *B60R 3/02* (2013.01); *E06C 5/04* (2013.01); *E06C 5/24* (2013.01)

(58) Field of Classification Search
CPC ... E06C 5/00; E06C 5/04; E06C 7/505; E06C 9/00; E06C 9/06; E06C 9/08; E06C 9/10; E06C 9/12; E06C 5/02; E06C 5/42; B60R 3/00; B60R 3/007; B60R 3/002; B60R 3/02
USPC ........................................................ 182/127
See application file for complete search history.

(56) References Cited

U.S. PATENT DOCUMENTS

| | | | | | |
|---|---|---|---|---|---|
| 304,821 | A | * | 9/1884 | Hofele ...................... | E06C 9/08 182/113 |
| 2,586,531 | A | * | 2/1952 | Gordon ..................... | E06C 5/04 182/108 |
| 2,840,290 | A | * | 6/1958 | Roberts ..................... | E06C 1/12 182/127 |
| 2,946,397 | A | * | 7/1960 | Berberich ................. | E06C 5/00 182/127 |
| 3,425,508 | A | * | 2/1969 | Faulstich .................. | E06C 5/00 182/18 |
| 3,601,220 | A | * | 8/1971 | Saucier ..................... | B60R 3/02 182/84 |
| 3,869,022 | A | * | 3/1975 | Wallk ........................ | E02F 9/00 182/207 |
| 4,021,071 | A | * | 5/1977 | Norman .................... | B60R 3/02 182/84 |
| 4,050,542 | A | * | 9/1977 | Wilson ...................... | A62B 1/20 182/10 |
| 4,079,815 | A | * | 3/1978 | Cormier .................... | B60R 3/02 182/195 |
| 4,492,286 | A | * | 1/1985 | Lemire ...................... | E06C 5/02 182/127 |
| 5,064,022 | A | * | 11/1991 | Graham .................... | B60R 3/02 182/127 |

(Continued)

*Primary Examiner* — Daniel P Chan

(57) ABSTRACT

An extendable ladder with hinge brackets specifically designed for the purpose of a person to have easier and safer access to a recreational vehicle roof. RV's have a permanently attached ladder on the rear of the vehicle that has to be climbed vertically, straight up which defies gravity. The hand rails and steps are small therefore making people feel very insecure and unsafe when climbing it. This invention overcomes that obstacle by giving people a firm ladder that reaches to the ground at an angle which makes it very easy to climb. The hinge bracket design creates a pivot affect that allows the two section extendable ladder to swing out at the bottom and extend downward to the ground, then the lower ladder can slide back up into the ladder rails and is positioned back against the RV.

6 Claims, 11 Drawing Sheets

(56) References Cited

U.S. PATENT DOCUMENTS

| | | | | |
|---|---|---|---|---|
| 5,172,952 A * | 12/1992 | Lasnetski | B60R 5/006 | 182/127 |
| 5,174,411 A * | 12/1992 | Oliver | E06C 9/10 | 182/77 |
| 5,438,925 A * | 8/1995 | Ohmi | B41F 13/00 | 101/212 |
| 5,469,933 A * | 11/1995 | Thomason | E06C 5/02 | 182/127 |
| 5,538,100 A * | 7/1996 | Hedley | E06C 5/04 | 182/127 |
| 5,878,836 A * | 3/1999 | Huang | E06C 9/08 | 182/85 |
| 5,967,257 A * | 10/1999 | Begin | E06C 9/085 | 182/159 |
| 6,012,545 A * | 1/2000 | Faleide | B60R 3/02 | 182/127 |
| 6,105,720 A * | 8/2000 | Kumher | E06C 9/12 | 182/127 |
| 6,378,654 B1 * | 4/2002 | Ziaylek, Jr. | B60R 3/005 | 182/127 |
| 6,739,349 B2 * | 5/2004 | Kastenschmidt | A01J 9/00 | 137/15.16 |
| 6,827,541 B1 * | 12/2004 | Ziaylek | E06C 5/02 | 182/127 |
| 6,866,118 B1 * | 3/2005 | Battenberg | E04F 11/068 | 182/77 |
| 6,986,402 B2 * | 1/2006 | Hedley | B60R 3/02 | 182/127 |
| 7,066,299 B1 * | 6/2006 | Fleming | E06C 1/20 | 182/107 |
| 7,111,858 B2 * | 9/2006 | Manser | B60R 3/02 | 182/127 |
| 7,168,521 B1 * | 1/2007 | Murray | A01M 31/02 | 182/116 |
| 7,516,997 B2 * | 4/2009 | Kuznarik | B62D 33/0273 | 182/127 |
| 7,721,849 B2 * | 5/2010 | Graffy | E06C 5/02 | 182/127 |
| 8,215,452 B2 * | 7/2012 | Stewart | B60R 3/02 | 182/127 |
| 8,944,211 B2 * | 2/2015 | Blaska | E06C 7/505 | 182/97 |
| 2004/0069566 A1 * | 4/2004 | Bareket | B60R 3/00 | 182/97 |
| 2004/0173406 A1 * | 9/2004 | Lantz | B60R 3/005 | 182/113 |
| 2005/0211502 A1 * | 9/2005 | LaBrash | B60R 3/02 | 182/127 |
| 2006/0108179 A1 * | 5/2006 | Sieb | B60R 3/005 | 182/127 |
| 2006/0272896 A1 * | 12/2006 | Rajewski | E06C 1/12 | 182/127 |
| 2007/0074933 A1 * | 4/2007 | Kerns | A01M 31/025 | 182/127 |
| 2007/0240936 A1 * | 10/2007 | Brookshire, Jr. | E06C 5/04 | 182/127 |
| 2012/0204362 A1 * | 8/2012 | Honeycutt | E01D 15/24 | 14/71.3 |
| 2016/0144209 A1 * | 5/2016 | Moore | A62C 27/00 | 169/24 |
| 2016/0221510 A1 * | 8/2016 | Petersen | B60R 3/02 | |

* cited by examiner

Top View

Side View

Ladder Sections

Rear View

Inside view of Hooks

Top View

EASY-CLIMB

BACKGROUND OF THE INVENTION

This invention is referenced throughout this document as an attached extendable ladder that has been specifically designed for the sole purpose of giving people a better, safer, easier, form of ascending to the roof of their recreational vehicle, more commonly known as RV, motor home or trailer. As used herein a ladder has different meanings, as in a step, stairs, folding ladders of different sizes, telescoping ladders, extension ladders and others. Ladders are being used to reach many different heights from changing a light bulb, reaching in a high cabinet, climbing onto a house roof or onto the roof of an RV. There are short household ladders, folding step ladders, extendable ladders and telescoping ladders, all of which are not connected at the top making them unsafe, unstable and ultimately leaving them prone to falling over sideways. They all serve the same purpose, but a ladder or extendable ladder is always set up with the lower end of the ladder on the ground, a floor or any other firm surface. Extendable ladders have the lower section on the ground, and the upper end leaning against a wall, building, or the side of a recreational vehicle at an angle of approximately 23 degrees. Stairs are usually about 45 degrees and affixed at the top whereas ladders are not, which in most cases make extendable ladders very vulnerable to falling over sideways. This happens often when used along side of an RV.

This invention has been designed to overcome this dangerous problem for RV owners and give them a safer, easier, less stressful means of ascending to the roof of their RV. This invention provides a pivoting mounted apparatus at the top of the attached RV ladder to affix a new extendable ladder that gives complete support for a climber when the lower section of the ladder is extended to the ground or a flat surface. This apparatus includes two hinge brackets #14 and two pivot bushings #20 that are the primary parts in providing a solid foundation for attaching the extendable ladder to the top of the RV attached ladder. Frequently there is a need to use the ladder that is permanently attached to the back of an RV, however the ladder has horizontally short narrow rungs and small round hand rails that make it hard to grasp onto, it's a 90 degree vertical ladder that gives a person the feeling of falling off backwards due to the force of gravity a person feels when climbing straight up. People have been known to fall off backwards. What is not available till now is this invention that provides a properly designed extendable ladder that is firmly attached to the top of an RV ladder that has been permanently attached to the back end of all RV's. This extendable ladder being connected to the top of the affixed RV ladder creates a bond for a sturdy, strong, and safe ladder that eliminates the hazards of falling over sideways. It will be a great public convenience and safety to have available a safe ladder such as this on the back of an RV. Conventional RV ladders do not reach below the height of the vehicle bumper which is relatively high off the ground, about 18 to 20 inches, making it hard for a person to reach the first rung of the ladder, therefore people use unsafe stools or other apparatus to reach that first step. This invention when extended, reaches to the ground level making it very easy for a person to climb to the roof of their RV. Many RV's have roof storage, there are roof vents, and attached air conditioners that require routine maintenance. Many people such as NASCAR enthusiasts frequently climb to the RV roof to watch races.

According to a professional search, examples of some prior art that gives reference to ladders for recreational vehicles are: U.S. Pat. No. 7,721,849 B2 to Graff, This apparatus has many parts that need to be attached to a flat surface by someone of mechanical experience and using several tools to do so, it recommends being attached to the side of a vehicle and this could very well interfere with the drivers rear view mirror. For a truck or some other vehicle of sort that does not already have a ladder for access to a roof it may be considered, for a motor home that has a ladder similar to this type already attached to the back, it would not be appealing because an RV owner would give little or no consideration to removing the vehicle attached ladder and be left with holes to patch on the back of their expensive RV. This apparatus does not attach to the top of the RV roof to give it the additional support it would need, such as that of the attached RV ladder. This apparatus does not reach to ground level making it difficult to reach the first step of an RV which is usually about 18 to 20 inches. U.S. Pat. No. 7,066,299 B1 to Fleming, This apparatus has some good features about it but here again it is not designed for a specific vehicle such as a motor home or trailer. Most RV owners would not be open to the idea of removing their attached ladder to replace it with another ladder. Though it does swing out at the bottom it does not reach ground level therefore leaving a high distance of 18 to 20 inches to the first rung which would require some sort of step stool or other apparatus to reach the first step. When it is removed it only makes another form of folding ladder that does not provide for a better or safer way of ascending to the roof of an RV. U.S. Pat. No. 6,012,545 to Faleide, This apparatus does not extend to the ground level for solid support and it requires some sort of apparatus to reach the first step of this ladder, the upper portion does not reach the top of an RV or a truck and there are no handrails at that level, therefore making it all but impossible to step upon the roof of any vehicle. It does not have a good appearance, it looks cumbersome and it would require a person of mechanical background to install it. For use on an RV a person would need to remove the attached RV ladder and that would leave holes to repair. All of this would be very unappealing to an RV owner. U.S. Pat. No. 8,215,452, B2 to Stewart. This apparatus requires many tools and a person of much mechanical expertise to install it, it has many parts that would require mounting holes to attach it, for RV use it would require the removal of the attached RV ladder leaving unsightly holes to repair, all of this would be very unappealing to an RV owner. This apparatus is unappealing to look at, it looks cumbersome. When extended upward there are no hand rails that connect up and over the edge of the roof top therefore making it very difficult to step upon the roof of any vehicle and this is most important for a persons stability. U.S. Pat. No. 6,378,654 B1 to Ziaylek, This apparatus has reasonable design however it appears to be very flimsy, it has very small hand rails, the upper portion that attaches to the roof has no height to allow for a person to hold onto when reaching the top of the RV roof, it reaches below the vehicle bumper but it does not make contact with the ground surface and this is necessary to give a secure feeling when stepping upon it, and the rungs appear to be narrow. Attaching this apparatus to the back of a motor home or trailer would require removing the attached RV ladder leaving unsightly holes to be repaired on the back of an expensive RV, all of which would be very unappealing to RV owners.

All of the above are intended to provide some form of access for a person to climb upon the roof of an RV, but they do not provide easy access, they are complicated to install and the biggest issue an RV owner will have with all of them is the factory affixed ladder on the back of their expensive RV would have to be removed leaving unsightly holes to be repaired thereby making it very unappealing to all RV owners. None of these patents illustrate the idea of using an existing RV ladder as a sturdy foundation for mounting an extendable pivoting ladder such as this invention does. This extendable ladder invention has no downward weight or pressure put upon the hinge bracket assembly because the ladder itself functions the same as a normal extension ladder when it is extended to the ground. The only pressure put upon the stainless steel hinge bracket is a slight amount of horizontal force against the firm solid RV ladder and back panel of the RV while a person climbs the ladder. It can not be stated enough how much this invention can make life safer, easier and less stressful for all RV owners.

BRIEF SUMMARY OF THE INVENTION

Prior art has shown that there are many different types of apertures that have been designed with the intent of acquiring an easier, safer access to the roof of recreational vehicles. Unfortunately that has not been achieved until now with the introduction of this ladder. The basis of having a correct design for attaching an extendable ladder or any other type of aperture to an RV should be how strong, solid and rigid is the foundation for where it is to be attached. This should be a key element taken into consideration when giving thought to the thousands of people that use them. This invention addresses this issue and has developed the ideal method of connecting an extendable ladder to the rigid, firmly attached RV ladder that is permanently attached to the back of all RV's. This invention also affords the world of RV enthusiasts the security and comfort of a new and revolutionary way of ascending to their RV roof top should and when it becomes necessary to make repairs or for the thousands of NASCAR enthusiasts that look forward to sitting on their roof top to just enjoy the races. Unfortunately at present they do not have the luxury of a better, easier way to get there.

There are many alternative designs that have been patented, however none of which are visible on the back of motor homes or in the RV market place to date, making it apparent that few if any of these alternatives have made any headway or have been instrumental in developing the long time need for an improved apparatus to climb upon an RV roof. Prior art has many different designs but most lack in different aspects such as, first and foremost a lack of a practical foundation, they are mostly complicated, they are cumbersome to use, installation is time consuming, and it would take a person of mechanical experience to install them. They do not have a good appearance and the attached RV ladder in most all cases has to be removed, which would be very unappealing to most all RV owners.

This invention will be very appealing to RV owners because it has all the attributes that will undoubtedly be the RV ladder to improve the lives of millions of RV owners because it is sturdy, rigid, safe, easier to use, easy to install and it blends with the attached RV ladder making it easy to look at which is of utmost importance to RV owners. This invention is a new and innovative idea that has its own unique components separating it from all other prior art that give reference to RV ladders.

BRIEF DESCRIPTION OF THE DRAWINGS

The accompanying 11 pages of drawings illustrate in whole and part several embodiments of this invention. Along with the description they serve to explain the principal of this invention. The drawings are intended to clarify the intent of each part of this invention and they do not limit this invention to include only the disclosed embodiments. NOTE: These drawing are not drawn to an exact scale, but do represent each part as they will be upon completion of this Ladder.

DETAILED DESCRIPTION OF THE INVENTION

Figures 1A, 1B:
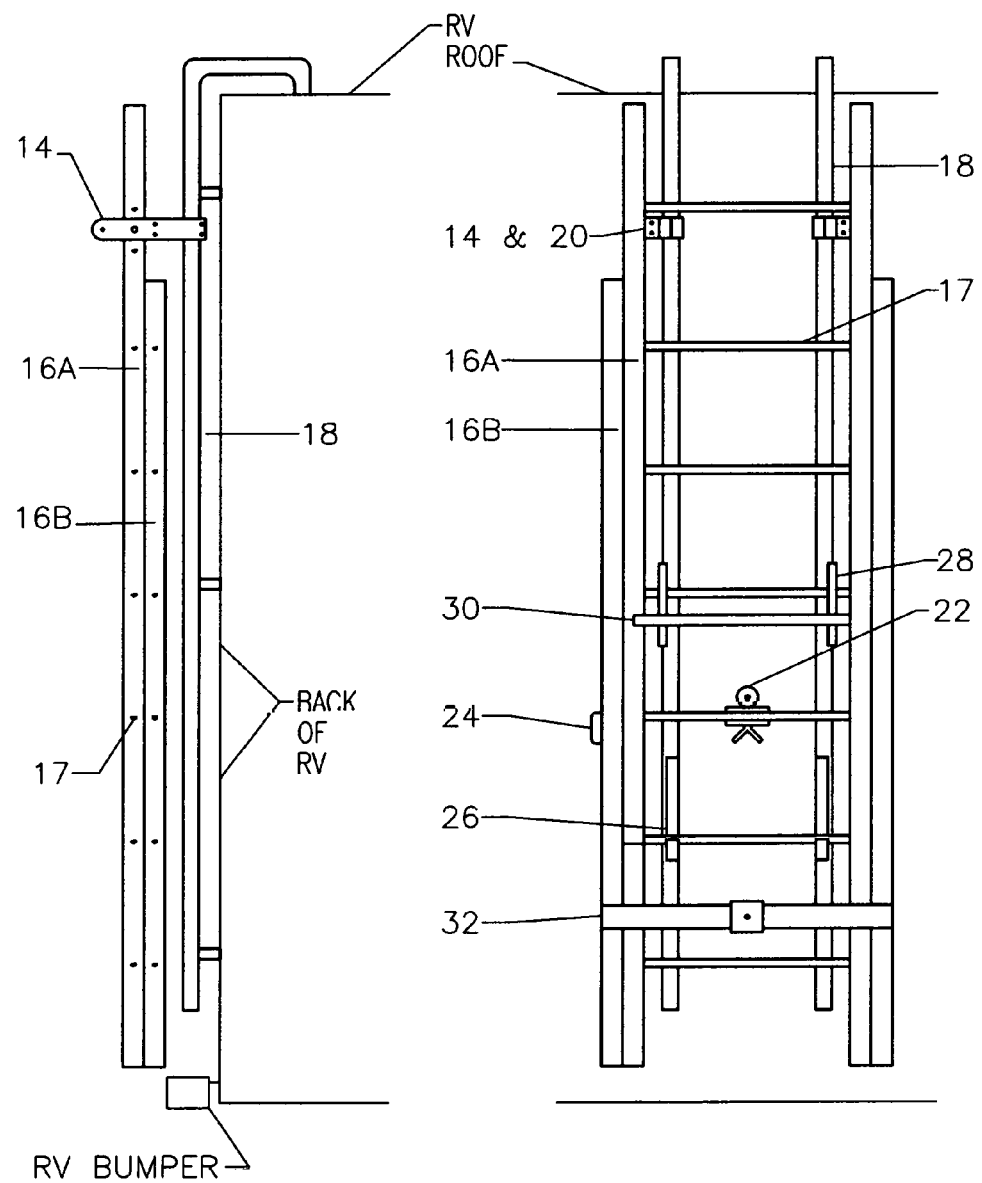
FIGS. 1A & 1B: A perspective view showing all the components of the invention with the RV ladder and extension ladder attached at the top by a pair of hinge brackets and pivot bushings.
Figure 2:
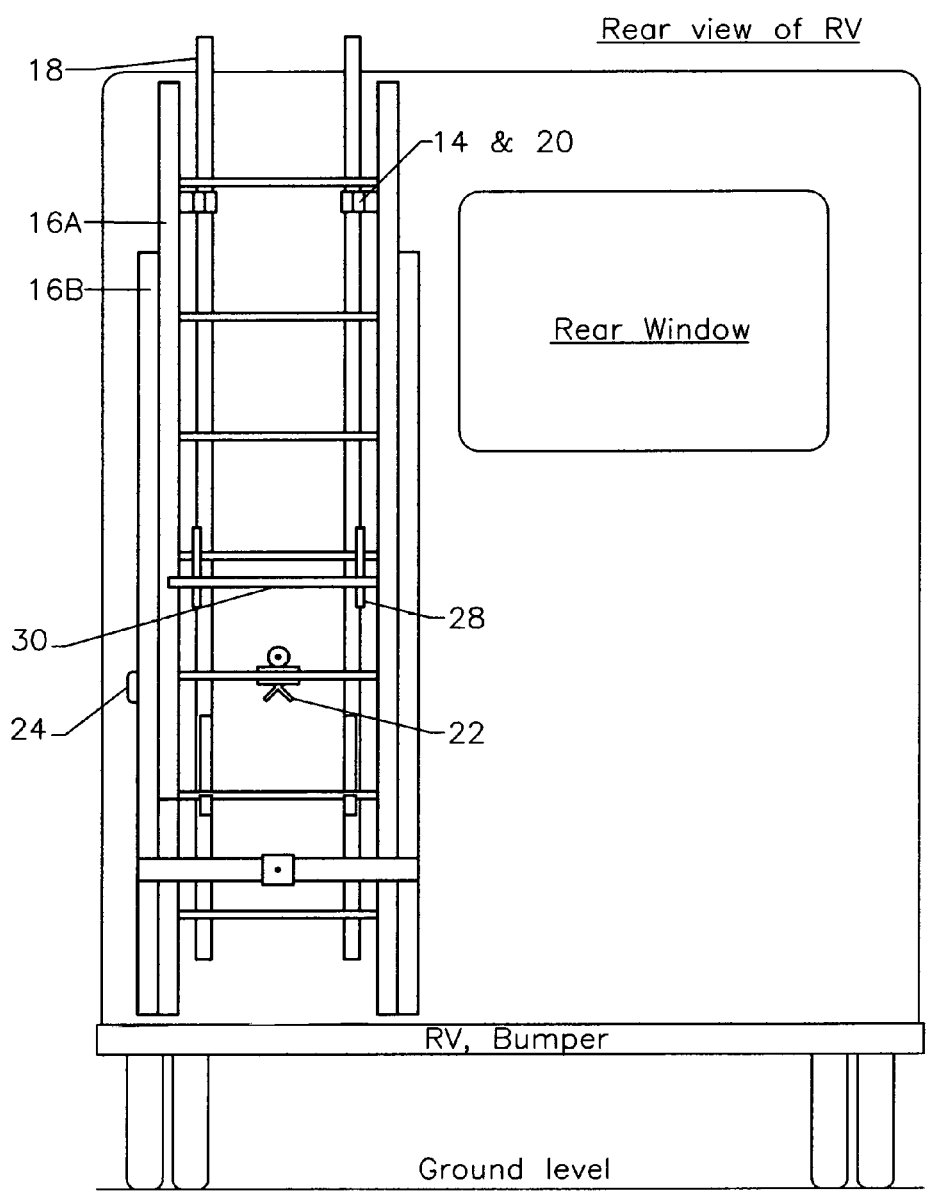
FIG. 2: A perspective view of a motor home showing the configuration of both ladders together and secured in place on the back of a motor home.
Figure 3:
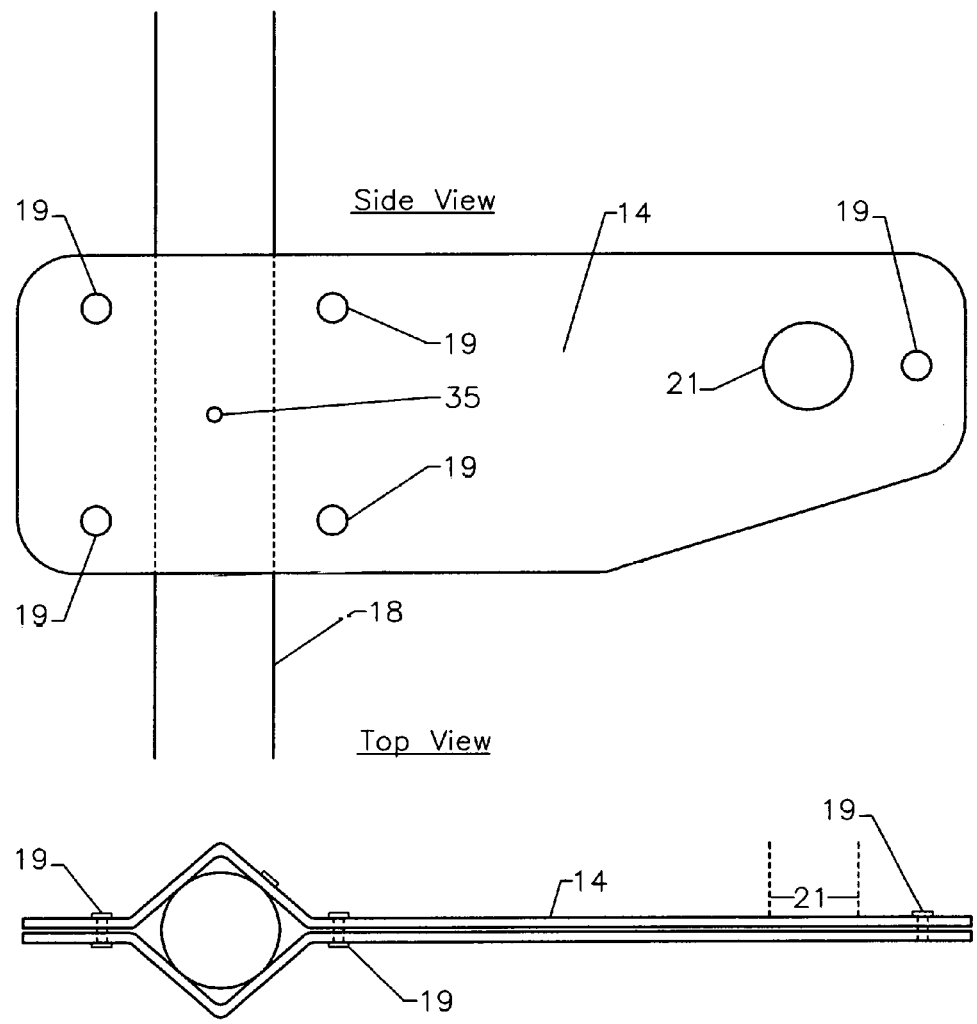
FIG. 3: A full side and top view of drawings showing how the hinge brackets attach the extension ladder and the RV ladder together.
Figure 8:
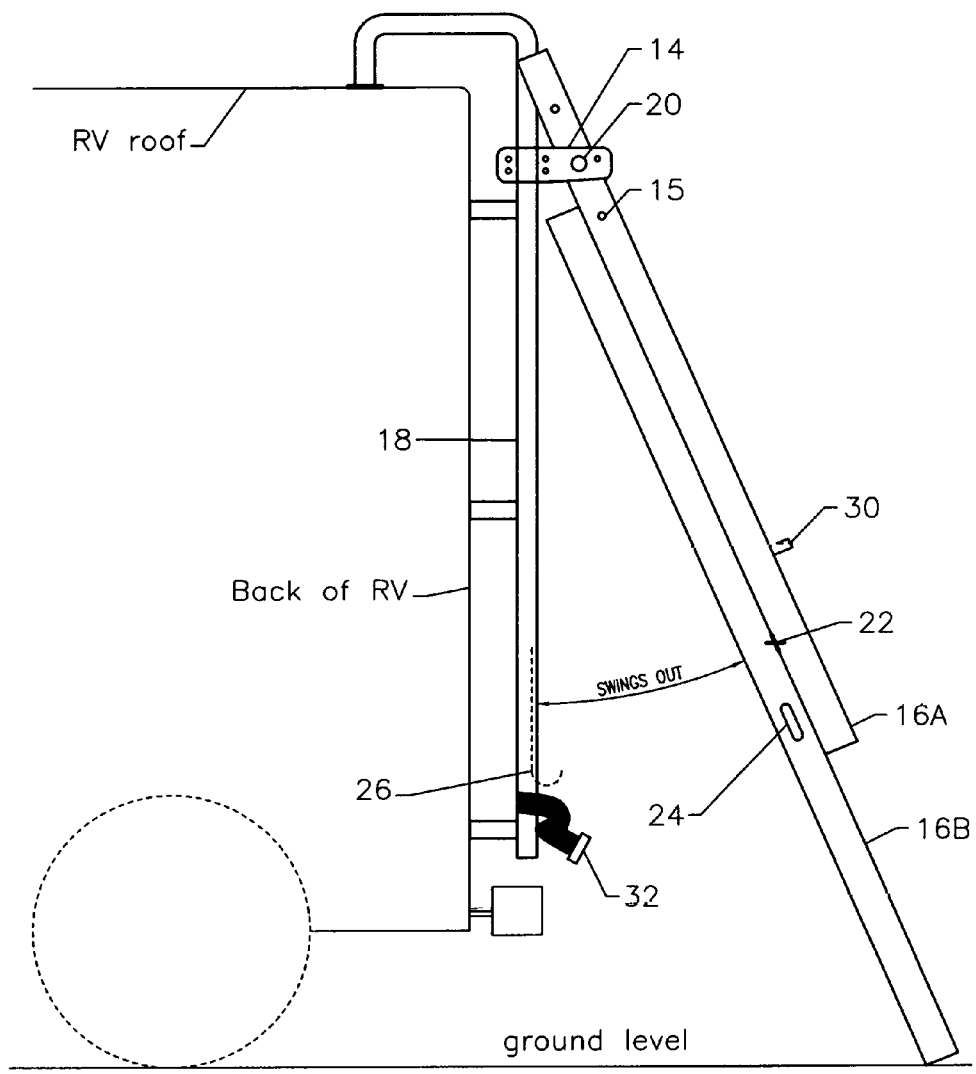
FIG. 8: A perspective view of a motor home side, showing how the extension ladder and the RV ladder are connected at the top making it possible for the extension ladder to swing out away from the motor home so it can be extended down to the ground level.

In a first embodiment of this invention several parts are fabricated to create an assembly of an affixed Extendable Ladder that will be more secure, easier and safer to access the roof of a recreational vehicle, more commonly known as an RV motor home or trailer. The materials are sturdy and weather resistant to protect them from all climates, and sturdy enough to support an adult person. The extendable ladder #16 is a 16' foot standard type ladder that can be purchased at any hardware store. This is a two section ladder that has slide rails, whereas one segment can be inverted into the other segment or to allow for the lower segment to slide downward to ground level. This extendable ladder is slightly modified to adapt to all of the additional special parts that makes the assembly of this invention possible. There are two hinge brackets #14 and two pivot bushing #20 both of which are the primary parts in making this invention unique and independent from all other prior art of its kind. As shown in FIGS. 1A & 1B there are drawings of two ladders, one being a vertical extendable ladder #16, the other being a vertical ladder #18 that is permanently attached to the rear of most all recreational vehicles. Both are attached together at the top by a pair of hinge brackets #14, One end is attached to the existing recreational vehicle ladder #18, and the other end attaches to the new extendable ladder #16 by a pair of pivot bushings #20. This creates a pivotal action that allows the extendable ladder #16, to swing out at the bottom and therefore be extended to the ground for ascending to the top of the RV, and it being affixed at the top makes it impossible to fall over sideways. The extendable ladder will be at an angle of approximately 20 degrees to 25 degrees as shown in FIG. 8, which is much safer and easier to climb than it is to climb straight up in a vertical 90 degree position like that of the affixed RV ladder #18 which only defies gravity making it dangerous and harder to climb. As shown in FIG. 2 the extendable ladder #16, is in an upright position against the affixed RV ladder #18, The extendable ladder #16 has slide rails typical to that of an extension ladder, and 7 cross membrane ladder rungs that will support the weight of an adult person. The location of the hinge brackets #14, and pivot bushings #20, are pointed out at the top of the ladders. Both of these parts are what makes this invention unique and separates it from all other prior art. As shown in FIG. 3, in keeping with the continuity of the upper structure of the ladder and its significance, this drawing shows the hinge bracket #14, of which there are two, each one has two sides that are bolted together to form one piece, and they are constructed of 1/8" stainless steel material which makes them indestructible to ware and weather. The side and top view describes in full how the hinge bracket #14, wraps around the RV ladder post #18, and how it is bolted together by five sets of stainless steel nuts and bolts #19, then a self tapping screw #35 is inserted into a hole on the side of the bracket and firmly tightened into the RV post. At the forward portion of the hinge bracket #14, is the 1 1/16" hole #21, where the pivot bushing #20, will slip into and hold the extendable ladder #16.

Figure 4:
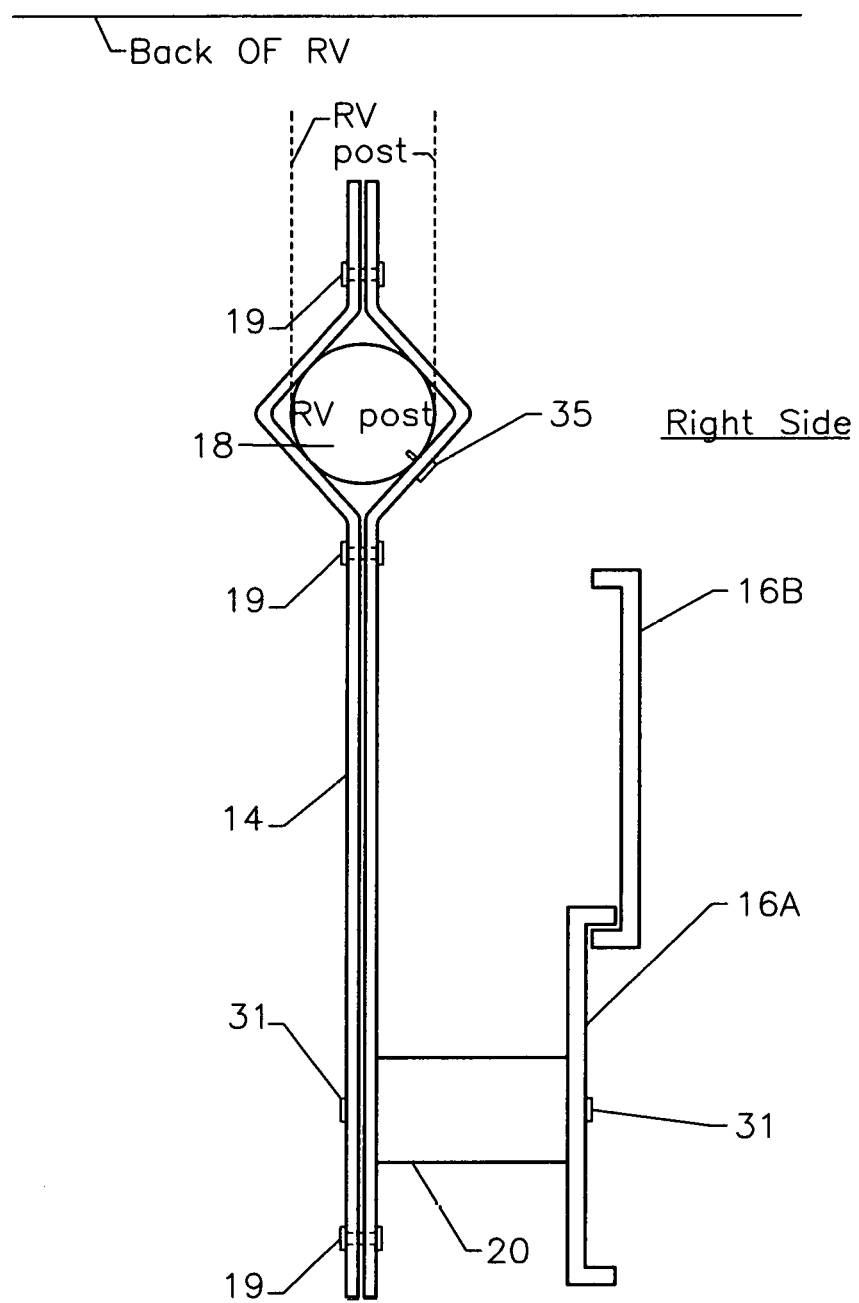
FIG. 4: A perspective top view of the hinge bracket and the pivot bushing showing how the extension ladder attaches to the pivot bushing on one end and the hinge bracket on the other end, then the hinge bracket connects to the existing RV ladder post on the other end of the bracket. At this point the RV ladder post is connected to the back of the RV by a short length of pipe that is horizontally connected between the ladder post and the back of the RV.
Figure 5:
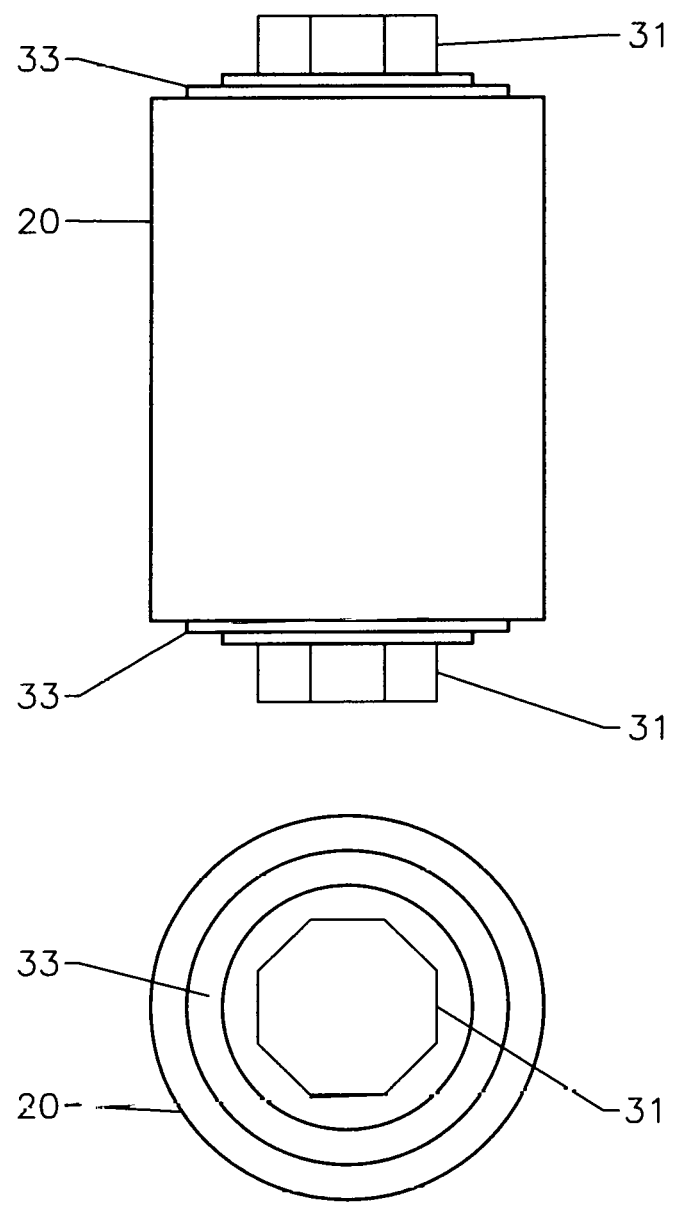
FIG. 5: A perspective view of the pivot bushing, showing how it attaches the existing RV ladder and the extension ladder together. This pivot bushing has replaced the pipe shown in the PPA drawings that would have been used to attach the two ladders together. The pipe was found to be an interference when climbing the extension ladder and unsafe to step over. The two pivot bushings have eliminated that problem making it safe and easy to climb. NOTE: This change in no way alters the purpose or intent of the original design.
Figure 6:
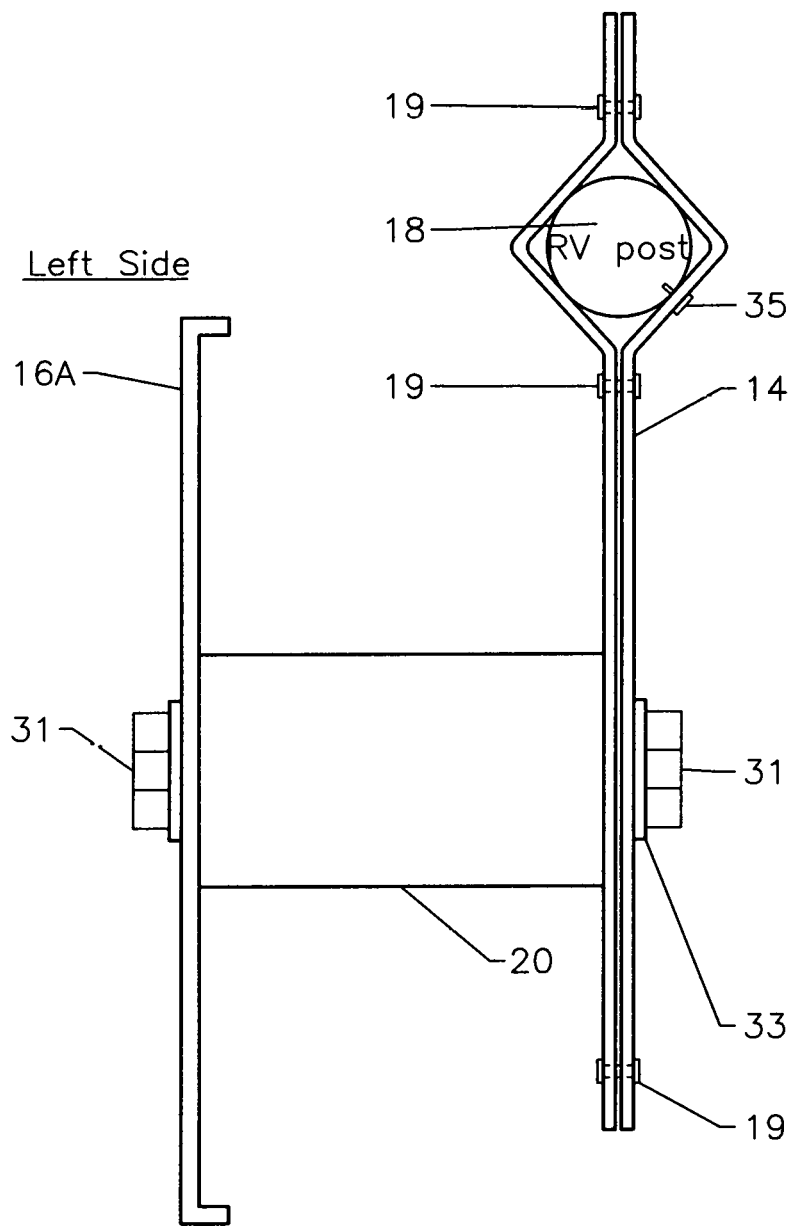
FIG. 6: A perspective top view of the pivot bushing. In better detail this drawing shows how the pivot bushing attaches the extension ladder to the hinge bracket.

As shown in FIG. 4, this demonstrates how the pivot bushing #20, is a key element in connecting the RV ladder #18, to the extendable ladder #16. To keep it in perspective, for a person facing the back of the RV looking straight at the hinge bracket assembly, this drawing shows the right side connection of the extendable ladder #16, exposing the top cross section of the pivot bushing #20, and the extendable ladders #16, slide rails. The pivot bushing #20, is cylindrical and constructed of a solid material such as stainless steel or aluminum to stay with the weather resistant concept. The pivot bushing #20, is firmly attached to the inside section of the extendable ladder #16, with a 7/16" stainless steel bolt #31, The other end slides into the 1 1/16" hole #21, at the forward end of the hinge bracket #14 as noted in FIG. 3, and a large flat washer is placed over the other 7/16" bolt and then firmly tightened into the other end of the pivot bushing #20, thusly allowing the extendable ladder #16, to pivot at the top and swing the bottom out away from the RV ladder #18, so it can be extended to the ground as shown in FIG. 8. As shown in FIG. 5 The pivot bushing #20 is designed to allow for a 7/16" bolt #31 to be inserted into each end of the bushing for the purpose of attaching the extendable ladder to the hinge bracket. As shown in FIG. 6, this is a view of the hinge bracket #14 on the left side of the ladder looking at it from the back of the RV. One end of the pivot bushing #20 will bolt to the extendable ladder #16A, the other end of the pivot bushing #20 will insert into the 1 1/16 hole of the hinge bracket #14 then the 7/16" bolt #31 will firmly attach the two ladders together again creating a pivotal action.

Figure 7:
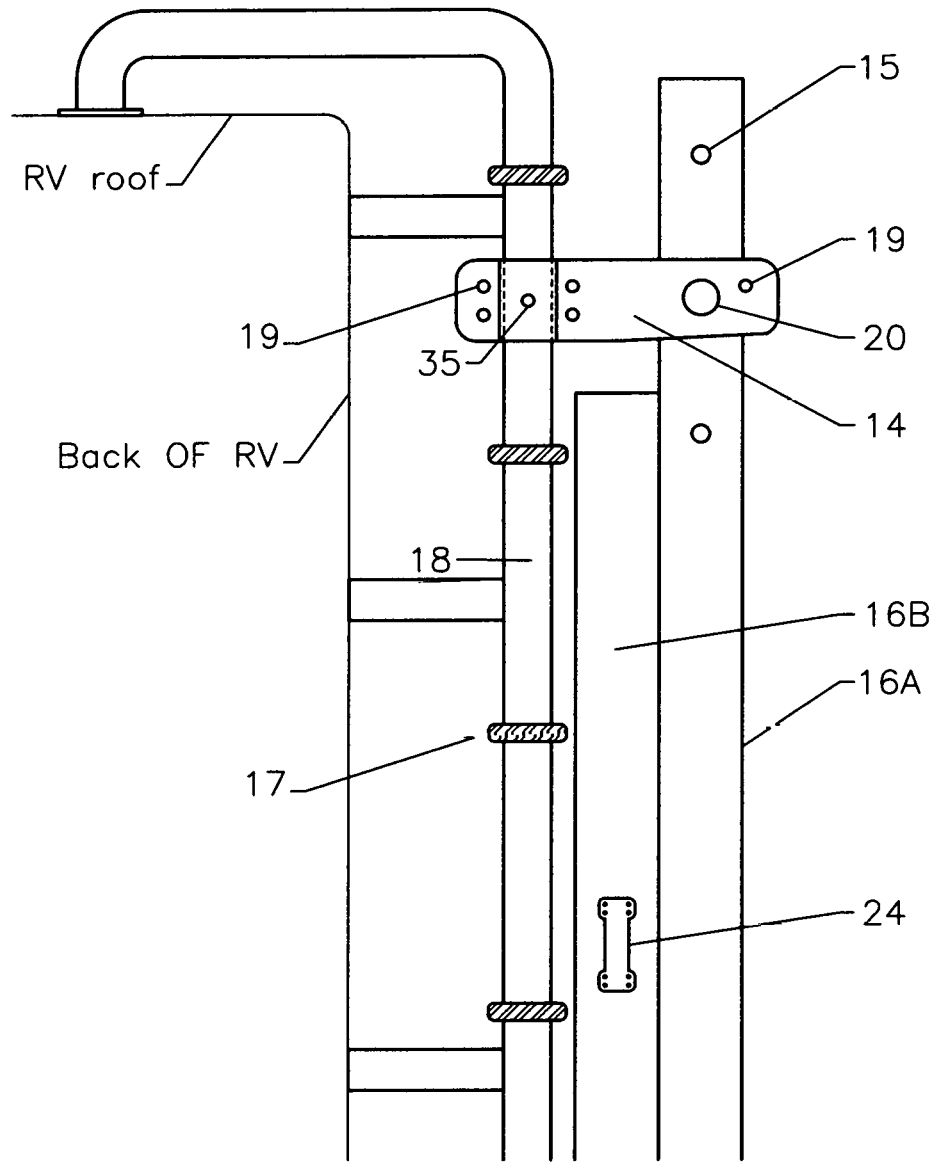
FIG. 7: A perspective side view of a motor home showing how the RV ladder is connected to the back of the RV by three horizontal lengths of pipe. Then it shows how the extension ladder and the RV ladder are connected together at the top by the hinge bracket and the pivot bushing.

FIG. 6 also demonstrates how the hinge bracket #14 acts as a clamp in connecting it to the RV ladder post #18 on one end and to the extendable ladder #16A on the other end. The stainless steel clamp #14 is bolted together by five sets of 3/8" stainless steel nuts and bolts #19 and therefore creating a strong and sturdy connection between the RV ladder post #18 and the new extendable ladder #16A. A self tapping screw #35 will be inserted into a 1/4" hole on the side of the bracket and firmly seated into the ladder post preventing the bracket from any possible side to side movement. FIG. 7 is a larger view of how the RV ladder and the extendable ladder are connected at the top, it also shows how the RV ladder is connected to the back panel of the RV by three horizontal 7" lengths of pipe and how the ladder reaches over the top of the RV and attaches to the roof, therefore making the ladder sturdy and firmly attached. At this upper point the hinge bracket #14 and the extendable ladder #16A connect together forming a bonded composition that acts as one unit, This gives a clear demonstration of how the hinge bracket #14 clamps to the RV ladder post #18 and the pivot bushing #20 supports the extendable ladder #16A Note: on the extendable ladder #16A there are two additional 7/16" holes #15 on each side of the pivot bushing attachment, they are for the purpose of the installer to determine what hole works best for the height and model of the motor home the extension ladder is being attached to. Also shown in FIG. 7, section #16B of the extension ladder shows the portion that slides downward to the ground level creating a sturdy, solid ladder for a person to climb upon the roof of an RV.

Figure 9:
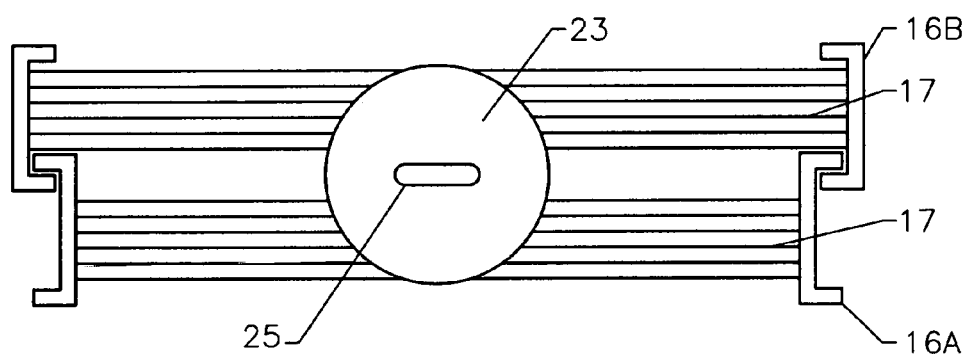
FIG. 9: A top and side view of the locking clamp showing how the ¼" eye bolt is inserted into the top plate, then down and in between the two extension ladder rungs followed by the lower plate being inserted over the end of the bolt and then the wing nut tightens both plates together.
Figure 9:
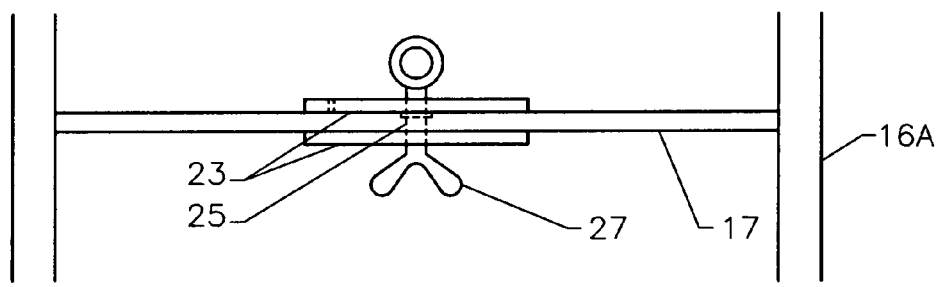
Figure 10:
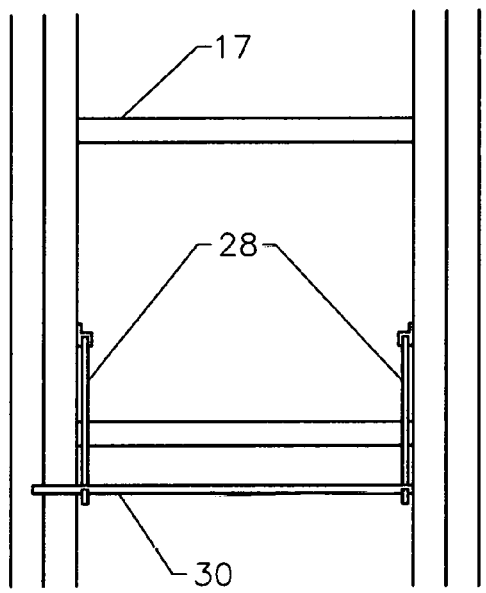
FIG. 10: Drawings showing how the extension ladder step hooks work and how the release bar when pulled up, disengages the step hooks making it easier to slide the lower ladder section up or down into the slide rails of the upper section of the extension ladder.
Figure 10:
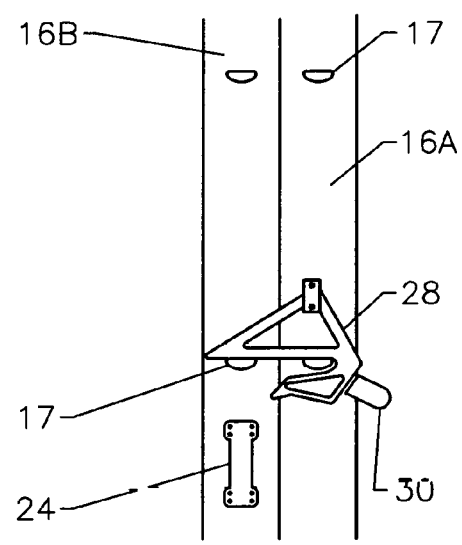
Figure 10:
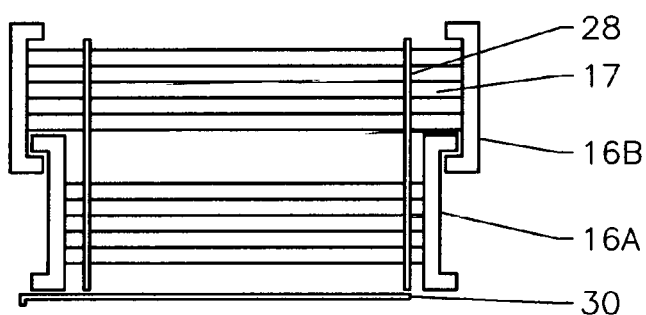
Figure 11:
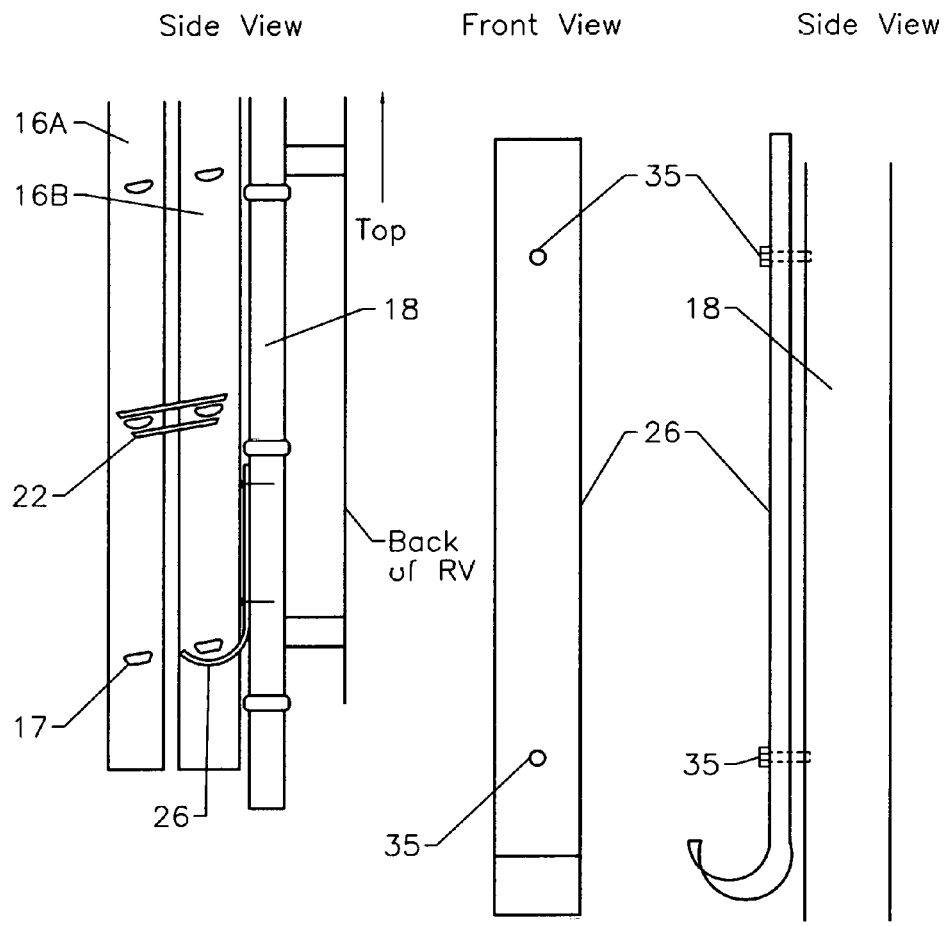
FIG. 11: These are ladder hanger hooks that replace the prior PPA designed ladder hooks. This newer design makes it easier to seat the extension ladder into, and it is a more rigid design than the prior design. This newer design does not in any way alter the purpose or intent of the prior hanger hooks.

FIG. 8 This shows a configuration of two ladders that are connected together at the top and are permanently attached to the back of an RV. This side view of a motor home shows the extendable ladder #16A attached at the top to the end of the hinge bracket #14, As shown in this drawing it demonstrates how the extendable ladder section #16B is extended downward. Simply remove it from the hanger hooks #26 then while holding onto the lift handle #24, swing the ladder away from the RV at the bottom, pull outward on the release bar #30, then the slider rails of the two ladder sections will allow ladder section #16B to slide down to the ground level, thereby leaving it at a desired angle comfortable for a person to climb. When finished using the ladder simply grasp the lift handle #24 and while holding the release bar #30 retract the lower section #16B up into the upper ladder section #16A and seat it back into the hanger hooks #26. It is then strapped in place by the tie down buckle strap #32. FIG. 9 portrays how the complete travel lock bracket #22 is designed and works, the top view of a ladder section demonstrates how the 4"×1/4" aluminum plate #23 and the eye section of the 1/4" eye bolt #25 inserts into the hole on the plate then down between the two ladder rungs of the extendable ladder sections #16A and 16B. A side view of the ladder section and rungs demonstrates how the lower 4"×¼" aluminum plate #23 slips over the lower end of the eye bolt #25 and the wing nut #27 is firmly tightened to form what is similar to that of a one piece ladder for stability and securing the ladder for travel. FIG. 10 Demonstrates how the release bar #30 functions to release the step hooks #28. To extend the lower ladder section #16B downward the release bar #30 must be pulled outward to release the step hooks #28 therefore allowing the lower ladder section to slide downward, once the ladder is at the desired angle it is let go and secures the ladder at that position. To return the ladder up and against the RV ladder #18 grasp the lift handle #24 and while holding the release bar #30 outward, slide the lower ladder section #16B upward and in against the RV ladder #18. The top cut away view of the ladder sections shows how the step hooks #28 cross over both rungs of the ladder sections #16A and 16B. this now holds both ladders together when closed. FIG. 11 is a side view that demonstrates how the hanger hooks #26 are used to seat the extension ladder #16 when not in use. The hanger hooks #26 are made of ¼" thick by 1" wide aluminum weather resistant material. The hanger hooks #26 are firmly attached horizontally between the two lower rungs of the RV ladder post #18 using two ¼" stainless steel self tapping screws #35, therefore creating a cradle for ladder section #16B to seat in the hooks when the complete ladder is not in use. This completes the mechanics of how the easy-climb ladder is constructed to include the materials, all of its components and fabrications. It must be pointed out again how the sturdy attached RV ladder is used as a firm foundation for this invention which makes it so unique and so independent from all prior art of this form.

I claim:

1. An extendable ladder assembly configured to be permanently attached to a vehicle, the extendable ladder assembly comprising:
    a first ladder having a first section and a second section, the first section having a first pair of substantially parallel stiles connected by a first plurality of horizontal rungs, the second section having a second pair of substantially parallel stiles connected by a second plurality of horizontal rungs, the second section configured to slide with respect to the first section in order to extend and shorten an overall length of the first ladder;
    a second ladder having a third pair of substantially vertical parallel stiles connected by a third plurality of horizontal rungs, the second ladder configured to be permanently attached to a roof and a rear surface of the vehicle;
    a pair of hinge brackets directly connecting a top portion of the first pair of stiles respectively to a top portion of the third pair of stiles, a first end of each said bracket having a pivot bushing directly connected to the first ladder to allow the first ladder to swing outwardly away from the vehicle in order for the second section to be able to slide downwardly with respect to the first section, a second end of each said bracket forming a clamp and having a fastener collectively configured to rigidly clamp onto each of the third pair of stiles respectively;
    wherein, the first ladder is configured to pivot about the pivot bushings between a first stored position and a second use position, the first stored position being when a major plane of the first ladder is substantially parallel with a major plane of the second ladder so that the extendable ladder assembly is stored adjacent to the rear surface of the vehicle, and the second use position being when an acute angle at said brackets is formed between the major plane of the first ladder and the major plane of the second ladder as the second section of the first ladder extends downwardly to a ground level in order to allow a user to climb the first ladder and onto the roof of the vehicle.

2. The extendable ladder assembly according to claim 1, wherein the second section of the first ladder is positioned inside the first section and configured to slide with respect to the first section.

3. The extendable ladder assembly according to claim 1, wherein the stiles of the second ladder are configured to be firmly bolted to the roof and the rear surface of the vehicle in order to create a rigid foundation and mounting surface for the second ladder, the brackets and the first ladder;
    wherein an end of each of the pivot bushings is respectively and firmly bolted to each of the first pair of stiles, the pivot bushings thereby forming a pivot axis for the first ladder to swing outwardly away from the vehicle so that the second pair of stiles can slide downwardly toward the ground level into the second use position, and then be retracted up into the first pair of stiles in order to allow the first ladder to swing back inwardly toward and against the vehicle into the first storage position.

4. The extendable ladder assembly according to claim 1 further comprising a strap configured to secure the ladder assembly in the first storage position, or having a hook configured to secure the ladder assembly in the first storage position, or having both of the strap and the hook.

5. A combination of the extendable ladder assembly according to claim 1 and the vehicle, wherein the second ladder is permanently attached and firmly bolted to the rear surface of the vehicle.

6. The combination according to claim 5, wherein the vehicle is a recreation vehicle.

* * * * *